N. A. BALDWIN.

METHOD OF ATTACHING SWEAT-BANDS TO HATS.

No. 7,771. Reissued July 3, 1877.

Witnesses.
J. N. Chauncey
Clara Broughton

Nathan A. Baldwin
Inventor
By Atty.
John E. Earle

N. PETERS, PHOTO-LITHOGRAPHER, WASHINGTON, D. C.

UNITED STATES PATENT OFFICE.

NATHAN A. BALDWIN, OF MILFORD, CONNECTICUT.

IMPROVEMENT IN METHODS OF ATTACHING SWEAT-BANDS TO HATS.

Specification forming part of Letters Patent No. 177,452, dated May 16, 1876; Reissue No. 7,771, dated July 3, 1877; application filed April 12, 1877.

*To all whom it may concern:*

Be it known that I, NATHAN A. BALDWIN, of Milford, in the county of New Haven and State of Connecticut, have invented a new Improvement in Methods of Attaching Sweat-Bands to Hats; and I do hereby declare the following, when taken in connection with the accompanying drawings and the letters of reference marked thereon, to be a full, clear, and exact description of the same, and which said drawings constitute part of this specification, and represent, in—

Figure 1:
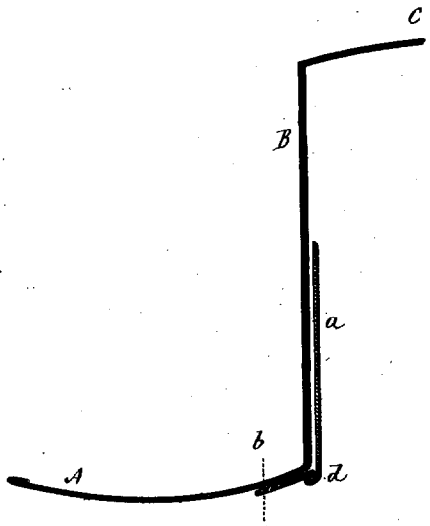
Figure 2:
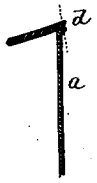
Figure 3:
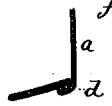

Figure 1, a partial section of a hat, showing the method of attaching the sweat; and in Figs. 2 and 3, detached views.

This invention relates to an improvement in the method of attaching sweats to hats, with special reference to hats made from braid, or of like character.

In the usual construction the sweat has been stitched to the hat at the angle of the crown and brim, which, in many cases, exposes the edge of braid to come in contact with the forehead of the wearer, and, owing to the natural roughness of the braid, it is difficult to make a nice job of this part of the work. Again, the perspiration easily passes through the needle-perforations, and soon stains the exterior of the hat.

The object of this invention is to overcome these difficulties; and it consists, principally, in securing the sweat to the brim of the hat by a line of stitches perpendicularly through the brim and outside the plane of the crown.

A represents the brim, B the side of the crown, and C the top, of a common hat; *a*, the sweat, from which a projection extends outward and onto the under surface of the brim, and is there secured to the brim by a line of stitches perpendicularly through the brim and outside the vertical plane of the crown, thus isolating, as it were, the seam from the angle of the crown and brim, and thereby avoiding the discoloration produced by perspiration.

The projection from the sweat is here represented as produced by a strip of braid or other material, first secured to the edge of the sweat, as at *d*, the sweat and strip stitched together, as indicated in Fig. 2, the stitches passing through the inner edge of the strip and edge of the sweat, then the sweat turned inward, as indicated in Fig. 3, then placed in the hat, so as to bring the said projection onto the under surface of the brim, and there stitched, as before described.

I claim—

1. A hat the sweat-lining of which is secured by a succession of stitches perpendicularly to the brim and outside the plane of the crown, substantially as described.

2. In the manufacture of hats, the method herein described of attaching sweats, consisting in securing the sweat to the inner edge of an independent strip of material, and the said strip secured to the hat, substantially as specified.

NATHAN A. BALDWIN.

Witnesses:

W. G. MITCHELL,

CLARA BROUGHTON.